(12) United States Patent
Kim et al.

(10) Patent No.: US 8,810,630 B2
(45) Date of Patent: Aug. 19, 2014

(54) VIDEO PROCESSING APPARATUS, CONTENT PROVIDING SERVER, AND CONTROL METHOD THEREOF

(75) Inventors: Jung-su Kim, Suwon-si (KR); Keum-yong Oh, Yongin-si (KR); Da-na Jung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 244 days.

(21) Appl. No.: 13/095,448

(22) Filed: Apr. 27, 2011

(65) Prior Publication Data

US 2012/0075418 A1    Mar. 29, 2012

(30) Foreign Application Priority Data

Sep. 27, 2010 (KR) .................. 10-2010-0093386

(51) Int. Cl.
*H04N 13/00* (2006.01)
*H04N 15/00* (2006.01)
*H04N 7/32* (2006.01)

(52) U.S. Cl.
CPC ..... *H04N 13/0055* (2013.01); *H04N 19/00769* (2013.01)
USPC ............. 348/43; 348/42; 348/56; 375/240.01

(58) Field of Classification Search
USPC .................................. 348/41–161
See application file for complete search history.

(56) References Cited

U.S. PATENT DOCUMENTS

| | | | | |
|---|---|---|---|---|
| 8,269,822 B2 * | 9/2012 | Zalewski | ........................ | 348/56 |
| 8,300,087 B2 * | 10/2012 | Hulyalkar et al. | .............. | 348/43 |
| 8,520,057 B2 * | 8/2013 | Lee et al. | ........................ | 348/43 |

(Continued)

FOREIGN PATENT DOCUMENTS

JP      2005-217816 A      8/2005
KR   10-2006-0107282 A    10/2006

(Continued)

OTHER PUBLICATIONS

Communication, dated Dec. 5, 2013, issued by the European Patent Office in counterpart European Patent Application No. 11163294.9.

(Continued)

*Primary Examiner* — Joseph Ustaris
*Assistant Examiner* — Talha Nawaz
(74) *Attorney, Agent, or Firm* — Sughrue Mion, PLLC

(57) ABSTRACT

Disclosed are a video processing apparatus, a content providing server, and control methods thereof. The video processing apparatus includes: a receiver which receives a two-dimensional (2D) video signal; a communication unit which communicates with a content providing server providing a supplementary video signal for a three-dimensional (3D) video signal corresponding to the 2D video signal; a signal processor which processes the 2D video signal and the supplementary video signal; and a controller which controls the communication unit to receive the supplementary video signal corresponding to the received 2D video signal from the content providing server, and the signal processor to generate the 3D video signal based on the received supplementary video signal and the received 2D video signal. Accordingly, it is possible to generate and reproduce the 3D video signal corresponding to the 2D video signal.

24 Claims, 7 Drawing Sheets

(56) References Cited

U.S. PATENT DOCUMENTS

| | | | |
|---|---|---|---|
| 2007/0186266 A1* | 8/2007 | Watson et al. | 725/134 |
| 2007/0186286 A1 | 8/2007 | Shim et al. | |
| 2008/0120676 A1* | 5/2008 | Morad et al. | 725/127 |
| 2010/0141738 A1 | 6/2010 | Lee et al. | |
| 2010/0194857 A1* | 8/2010 | Mentz et al. | 348/43 |
| 2010/0275238 A1* | 10/2010 | Nagasawa et al. | 725/116 |
| 2011/0012992 A1* | 1/2011 | Luthra et al. | 348/43 |
| 2011/0026608 A1* | 2/2011 | Luthra | 375/240.26 |
| 2011/0122237 A1* | 5/2011 | Hong | 348/56 |

FOREIGN PATENT DOCUMENTS

| | | |
|---|---|---|
| KR | 10-2008-0033433 A | 4/2008 |
| WO | 2007/013764 A1 | 2/2007 |
| WO | 2008/053417 A1 | 5/2008 |

OTHER PUBLICATIONS

Communication, dated Mar. 4, 2014, issued by the European Patent Office in counterpart European Patent Application No. 11163294.9.

* cited by examiner

VIDEO PROCESSING APPARATUS, CONTENT PROVIDING SERVER, AND CONTROL METHOD THEREOF

CROSS-REFERENCE TO RELATED APPLICATION

This application claims priority from Korean Patent Application No. 10-2010-0093386, filed on Sep. 27, 2010 in the Korean Intellectual Property Office, the disclosure of which is incorporated herein in its entirety by reference.

BACKGROUND

1. Field

Apparatuses and methods consistent with exemplary embodiments relate to a video processing apparatus, a content providing server and control methods thereof, and more particularly, to a video processing apparatus which reproduces a three-dimensional (3D) video signal, a content providing server which provides contents and control methods thereof.

2. Description of the Related Art

In general, a video processing apparatus processes and reproduces a two-dimensional (2D) image when receiving a 2D video signal, and processes and reproduces a 3D image when receiving a 3D video signal. Thus, a related art video processing apparatus cannot process and reproduce a 3D image if receiving a 2D video signal. With an increased demand for a 3D image, there is a need for an image processing apparatus capable of reproducing a 3D image based on the existing 2D video signal.

SUMMARY

Accordingly, one or more exemplary embodiments provide a video processing apparatus, a content providing server and a control method thereof, in which the video processing apparatus receives a 2D video signal and reproduces a 3D video signal by receiving a supplementary video signal for generating the 3D video signal corresponding to the 2D video signal from the content providing server.

According to an aspect of an exemplary embodiment, there is provided a video processing apparatus including: a receiver which receives a two-dimensional (2D) video signal; a communication unit which communicates with a content providing server providing a supplementary video signal for a three-dimensional (3D) video signal; a signal processor which processes the 2D video signal and the supplementary video signal; and a controller which controls the communication unit to receive the supplementary video signal corresponding to the received 2D video signal from the content providing server, and the signal processor to generated a 3D video signal based on the received supplementary video signal and the received 2D video signal.

The signal processor may generate a 3D video signal by using the received 2D video signal as one of left- and right-eye video signals, and using the received supplementary video signal as the other one of the left- and right-eye video signals.

The signal processor may include: a first decoder which decodes the received 2D video signal; and a second decoder which decodes the received supplementary video signal.

The signal processor may extract information used for synchronization from the decoded 2D video signal and the decoded supplementary video signal, respectively, and may synchronize the 2D video signal and the supplementary video signal to be displayed as a 3D image in accordance with the extracted information.

The video processing apparatus may further include a synchronous signal generator which generates a synchronous signal for opening and closing shutters of shutter glasses on the basis of the information used for the synchronization.

The controller may control the communication unit to transmit at least one of information about the video processing apparatus and information about the received 2D video signal when requesting the supplementary video signal.

The video processing apparatus may further include an encrypting unit, and the controller may control the encrypting unit to encrypt at least one of the information about the video processing apparatus and the information about the received 2D video signal, and control the communication unit to transmit the encrypted information.

The controller may output user notification information about use of the supplementary video signal corresponding to the 2D video signal.

The video processing apparatus may further include a display unit which displays the user notification information.

The video processing apparatus may further include a user input unit, and the controller may control the communication unit to receive the supplementary video signal when receiving a user's input for approving the use of the supplementary video signal through the user input unit.

According to an aspect of another exemplary embodiment, there is provided a content providing server including: a storage unit which stores at least one supplementary video signal for generating a three-dimensional (3D) video signal corresponding to a two-dimensional (2D) video signal; a communication unit which communicates with an external video processing apparatus; and a controller which controls the communication unit to select a supplementary video signal corresponding to a request from among the at least one stored supplementary video signal and to transmit the selected supplementary video signal to the external video processing apparatus if receiving the request for the supplementary video signal for generating the 3D video signal corresponding to the 2D video signal from the external video processing apparatus.

According to an aspect of another exemplary embodiment, there is provided a control method of a video processing apparatus, including: receiving a two-dimensional (2D) video signal; requesting a content providing server to transmit a supplementary video signal corresponding to the 2D video signal; and generating a three-dimensional (3D) video signal on the basis of the 2D video signal and the supplementary video signal and received in response to the request.

The generating the 3D video signal may include generating the 3D video signal by using the received 2D video signal as one of left- and right-eye video signals and the received supplementary video signal as the other one of the left- and right-eye video signals.

The generating the 3D video signal may include decoding the received 2D video signal and the received supplementary video signal, respectively.

The generating the 3D video signal may include extracting information used for synchronization from the decoded 2D video signal and the decoded supplementary video signal, respectively; and synchronizing the 2D video signal and the supplementary video signal to be displayed as a 3D image in accordance with the extracted information.

The control method may further include a synchronous signal for opening and closing shutters of shutter glasses on the basis of the information used for the synchronization.

The request for the supplementary video signal may include transmitting at least one of information about the video processing apparatus and information about the received 2D video signal when requesting the supplementary video signal.

The control method may further include encoding at least one of the information about the video processing apparatus and the information about the received 2D video signal.

The control method may further include outputting user notification information about use of the supplementary video signal corresponding to the 2D video signal.

The control method may further include displaying the user notification information; and receiving the supplementary video signal when receiving a user's input for approving the use of the supplementary video signal in accordance with the display.

According to an aspect of another exemplary embodiment, there is provided a control method of a content providing server, the control method including: storing at least one supplementary video signal for generating a three-dimensional (3D) video signal corresponding to a two-dimensional (2D) video signal; receiving, from an external video processing apparatus, a request to provide a supplementary video signal for generating the 3D video signal corresponding to the 2D video signal; and selecting a supplementary video signal corresponding to the request from among the at least one stored supplementary video signal and transmitting the selected supplementary video signal to the external video processing apparatus.

According to an aspect of another exemplary embodiment, there is provided a video processing system including: a video processing apparatus which receives a two-dimensional (2D) video signal, transmits a request for a supplementary video signal used to generate a three-dimensional (3D) video signal corresponding to the received 2D video signal, and, if the supplementary video signal is received in response to the transmitted request, generates the 3D video signal based on the received supplementary video signal and the received 2D video signal; and a content providing server which receives the request from the video processing apparatus, determines, according to the received request, whether the supplementary video signal corresponding to the 2D video signal exists among at least one supplementary video signal, and, if the supplementary video signal corresponding to the 2D video signal exists, transmits the supplementary video signal to the video processing apparatus.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
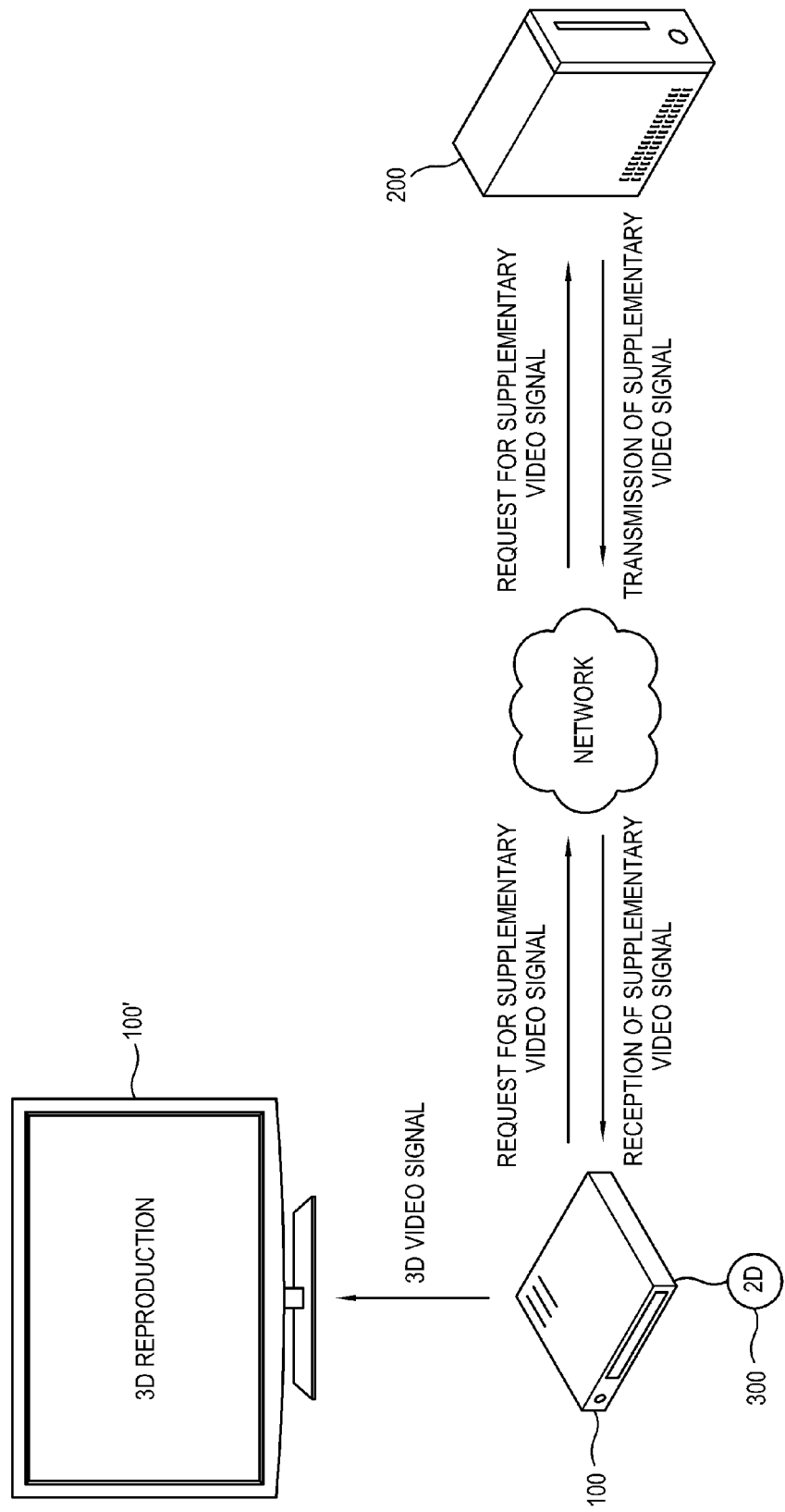
FIG. 1 is a schematic view of a video processing system according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

FIG. 1 is a schematic view of a video processing system according to an exemplary embodiment.

As shown therein, a video processing system includes a video processing apparatus 100 and a content providing server 200. The video processing apparatus 100 and the content providing server 200 are connected by a network via a predetermined communication unit, and transmit and receive various control signals and data through the communication unit. The video processing apparatus 100 in this exemplary embodiment requests the content providing server 200 to provide a supplementary video signal corresponding to a predetermined two-dimensional (2D) video signal, and the content providing server 200 transmits the supplementary video signal to the video processing apparatus 100.

The video processing apparatus 100 may be achieved by an electronic device without a display unit 100', such as a Blu-ray disc (BD) player, a digital versatile disc (DVD) player, a set-top box, etc., which can process and reproduce at least one of a 2D video signal and a three-dimensional (3D) video signal.

The video processing apparatus 100 may be achieved by a display apparatus with a display unit 100', such as a television, a computer system, etc., which can process and reproduce at least one of a 2D video signal and a 3D video signal. If the video processing apparatus 100 is the television 100', the video processing apparatus 100 may include an Internet Protocol television (IPTV) connected to the content providing server 200 using an Internet Protocol (IP).

The 2D video signal may be supplied to the video processing apparatus 100 from a recording medium such as a BD or a DVD disc, or an external storage unit 300 such as a universal serial bus (USB) memory, or may be previously stored in an internal memory (not shown) of the video processing apparatus 100. Also, the 2D video signal may be input through another electronic device connected via the communication unit.

When requested by the video processing apparatus 100 to provide a supplementary video signal corresponding to a 2D video signal, the content providing server 200 provides the supplementary video signal corresponding to the request to the video processing apparatus 100. The content providing server 200 may include a storage unit that stores data for providing a service, and a controller that processes the data and is in charge of communication with the video processing apparatus 100. Below, the video processing apparatus 100 and the content providing server 200 will be described in detail with reference to FIGS. 2 and 3.

Figure 2:
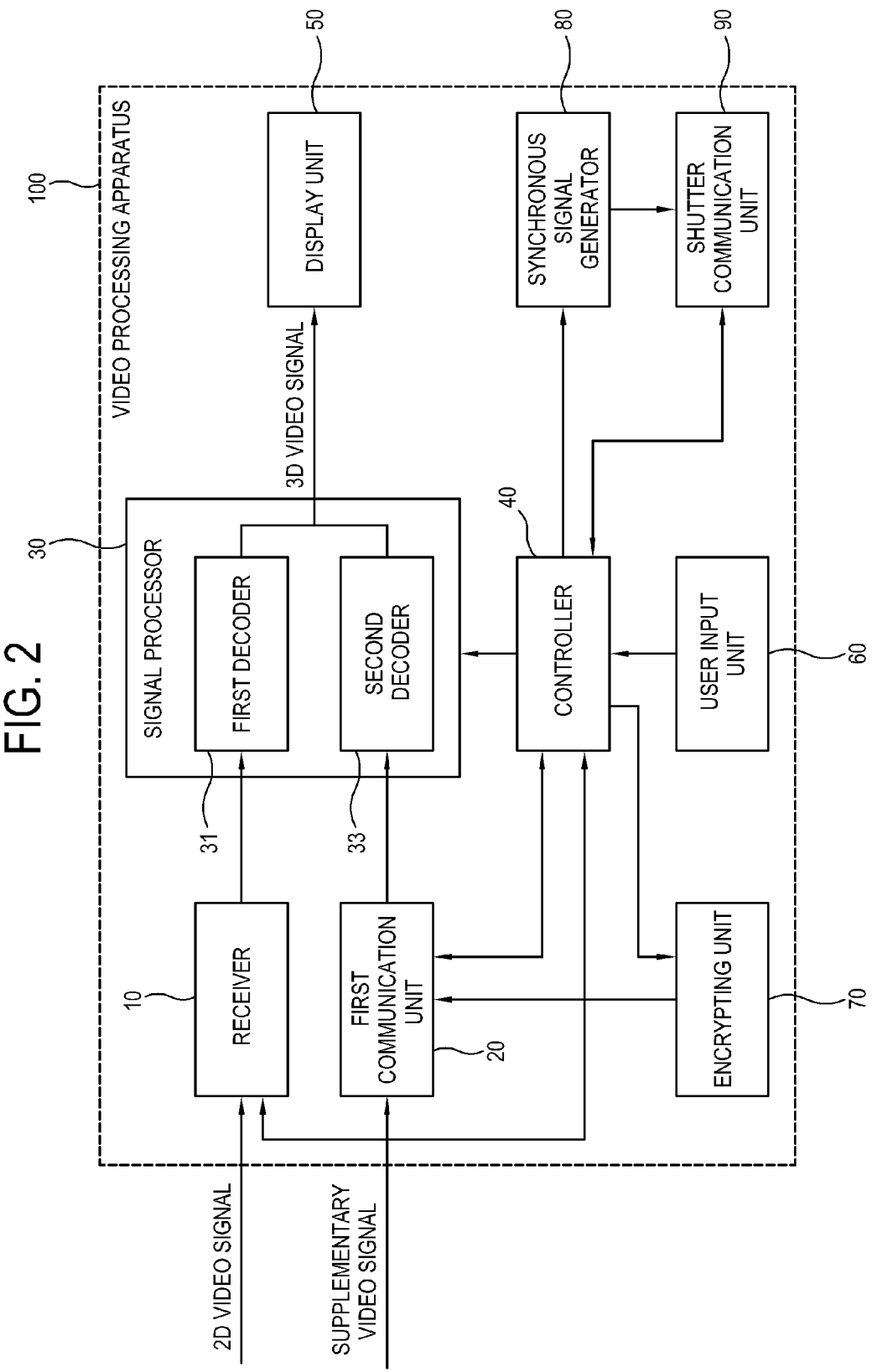
FIG. 2 is a control block diagram of a video processing apparatus according to an exemplary embodiment.

FIG. 2 is a control block diagram of a video processing apparatus 100 according to an exemplary embodiment. As shown therein, the video processing apparatus 100 includes a receiver 10, a first communication unit 20, a signal processor 30, a first controller 40, a display unit 50, a user input unit 60, an encrypting unit 70, a synchronous signal generator 80, and a shutter communication unit 90.

The receiver 10 receives a 2D video signal from an external video source (not shown) and transmits the received 2D video signal to the signal processor 30. While not limited thereto, the receiver 10 may receive a video signal from various video sources such as a computer (not shown) that generates a video signal with a central processing unit (not shown) and a graphic card (not shown) and provides the generated video signal locally, a server (not shown) that provides a video signal through a network, a transmitter (not shown) of a broadcasting station that transmits a broadcasting signal through airwaves or a cable, an external storage medium such as a BD, a DVD disc 300 (see FIG. 1), or a USB memory, etc. The 2D video signal may include a transport stream (TS) corresponding to Moving Picture Experts Group (MPEG) standards. Thus, the 2D video signal may further include an audio signal, interactive graphics (IG) data about at least one of a user input button and a menu, presentation graphics (PG) data about subtitles, etc., in addition to the video signal.

In a case that the video processing apparatus 100 is a TV, the receiver 110 wirelessly receives a radio frequency (RF) signal from a broadcasting signal transmitting device, or receives a video signal based on standards such as composite video, component video, super video, Syndicat des Constructeurs des Appareils Radiorécepteurs et Téléviseurs (SCART), high definition multimedia interface (HDMI), etc. At this time, the receiver 10 may further include an antenna (not shown) and/or a tuner (not shown) tuned to a broadcasting channel.

In a case that the video processing apparatus 100 is a monitor for a personal computer (PC), the receiver 10 may receive an image signal supported by standards such as D-SUB capable of transmitting RGB signals based on VGA, digital video interactive (DVI), DVI-analog (A), DVI-integrated digital/analog (I), DVI-digital (D), HDMI, etc.

Figure 3:
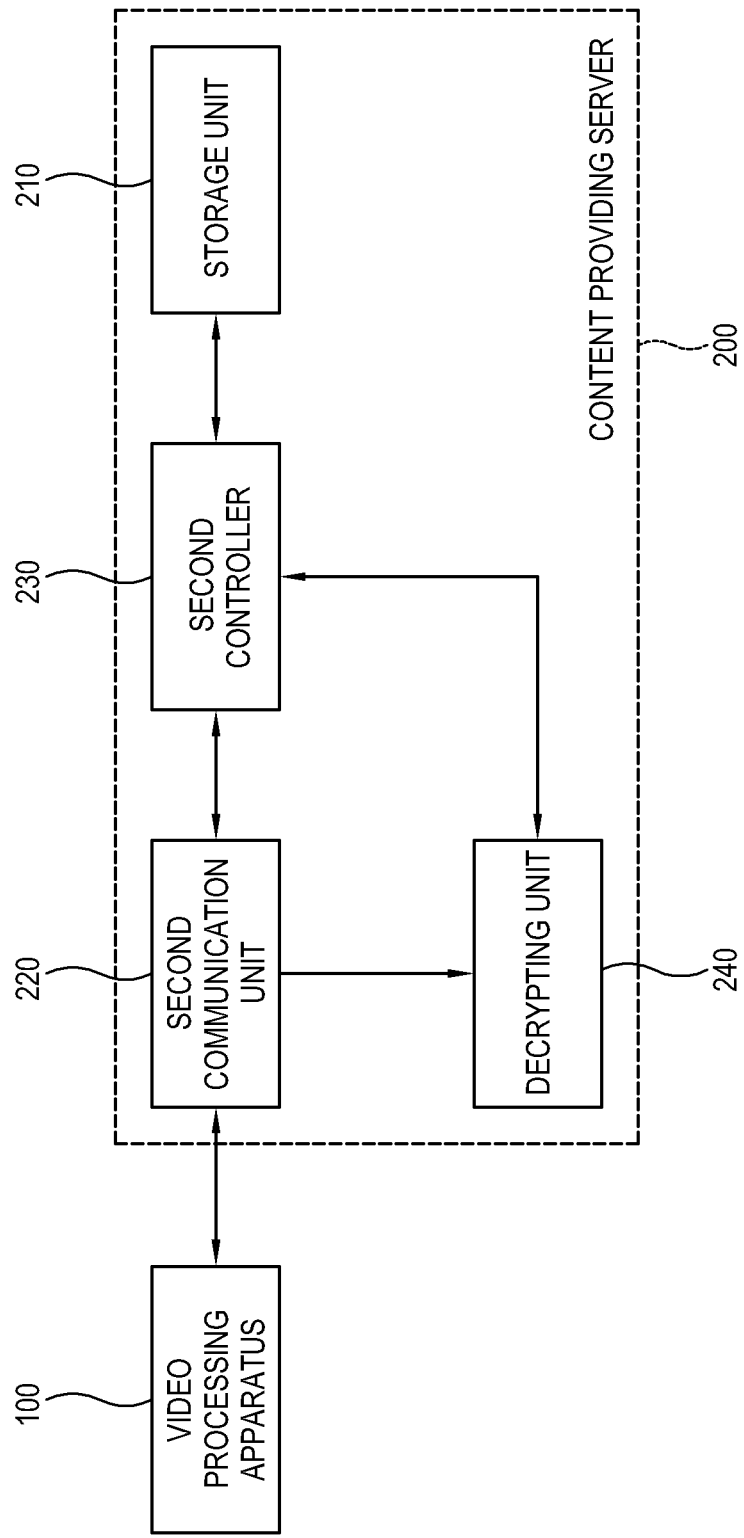
FIG. 3 is a control block diagram of a content providing server according to an exemplary embodiment.

The first communication unit 20 is connected to a second communication unit 220 of a content providing server 200 (as illustrated in FIG. 3) through a network such as a local area network (LAN), a wireless LAN (WLAN), and the like, and requests the content providing server 200 to provide a supplementary video signal corresponding to a 2D video signal, thereby receiving the supplementary video signal from the content providing server 200.

The signal processor 30 is capable of processing a 2D video signal and a supplementary video signal. Under control of the first controller 40, the signal processor 30 respectively processes a 2D video signal received by the receiver 10 and a supplementary video signal received by the first communication unit 20 and corresponding to the 2D video signal, thereby generating a 3D video signal. The signal processor 30 employs the received 2D video signal as one of left-eye and right-eye video signals, and the supplementary video signal as the other one of the left-eye and right-eye video signals, thereby generating a 3D video signal. Below, operations of the signal processor 30 related to generation of the 3D video signal will be described in detail with reference to FIG. 4.

The signal processor 30 may perform various general video processing procedures. There is no limit to the kind of video processing procedures, and the various general video processing procedures may include at least one of decoding and encoding corresponding to various video formats, de-interlacing, frame fresh rate conversion, scaling, noise reduction to enhance image quality, detail enhancement, line scanning, etc., by way of example. The signal processor 30 may perform the procedures individually or in combination.

The signal processor 30 may process an audio signal. Thus, the signal processor 30 may perform various preset audio processes with regard to an audio signal. There is no limit to the kind of processes, and various audio processes may include at least one of digital conversion for an analog voice signal, amplification for an audio signal, an output level control for an audio signal, frequency compensation for an audio signal, etc., by way of example. The processes may be performed individually or together.

The first controller 40 controls the first communication unit 20 to receive a supplementary video signal corresponding to a 2D video signal received by the receiver 10 from the content providing server 200, and controls the signal processor 30 to generate a 3D video signal based on the received supplementary video signal and the received 2D video signal.

When a 2D video signal is received through the receiver 10, the first controller 40 controls the first communication unit 20 to try to initially access the content providing server 200. When receiving a response signal from the content providing server 200 in accordance with the access, the first controller 40 collects information about the video processing apparatus 100 and information about the 2D video signal, and transmits the collected information to the content providing server 200. If the supplementary video signal corresponding to the 2D video signal is received from the content providing server 200, the first controller 40 outputs user notification information allowing a user to select whether to use the supplementary video signal corresponding to the 2D video signal. In response to the output of the user notification information, if a user approves the use of the supplementary video signal through the user input unit 60, the first controller 40 controls the first communication unit 20 to receive the supplementary video signal, and the signal processor 30 to generate a 3D video signal based on the received supplementary video signal and the received 2D video signal.

The display unit 50 displays a 3D image based on the 3D video signal generated by the signal processor 20. The display unit 50 may display a video frame by vertically arranging a plurality of horizontal scan lines scanned by the signal processor 30. The display unit 50 includes a display panel (not shown) for displaying the image. The display panel (not shown) may include a liquid crystal display (LCD) panel with a liquid crystal layer, an organic light emitting diode (OLED) panel with an organic light emitting layer, a plasma display panel (PDP), etc.

The user input unit 60 may receive an input corresponding to a user's selection. Thus, when user notification information allowing a user to select whether to use the supplementary video signal is displayed on the display unit 50 under control of the first controller 40, a user's selection for approving or refusing the use of the supplementary video signal can be input through the user input unit 60.

The encrypting unit 70 may encrypt the information about the 2D video signal and the information about the video processing apparatus 100 collected by the first controller 40. The information about the video processing apparatus 100 and the information about the 2D video signal may be encrypted using an encryption algorithm such as advanced encryption standard (AES), data encryption standard (DES), 3-DES, Rivest-Shamir-Adleman (RSA), etc.

The information about the video processing apparatus 100 may include at least one of information about the manufacturer, the product number, the specification, etc., of the video processing apparatus 100, which includes information about whether the video processing apparatus 100 can display the 3D image.

The information about the 2D video signal may include at least one of the provider, the title, etc., of the 2D video signal, and if the 2D video signal is received from the BD or the DVD, the information about the 2D video signal may include at least one of identification (ID), clip information, etc., of the BD or the DVD.

The synchronous signal generator 80 generates a synchronous signal for opening and closing shutters of shutter glasses on the basis of information used for synchronization between the supplementary video signal and the 2D video signal extracted from the signal processor 30. The synchronous signal generator 80 is used when the video processing apparatus 100 processes a 3D image and the 3D image is reproduced by a method of using the shutter glasses.

Further, the shutter communication unit 90 transmits the synchronous signal generated by the synchronous signal generator 80 to the shutter glasses (not shown), and the shutter glasses (not shown) open and close a left-eye lens and a right-eye lens in sync with the synchronous signal.

FIG. 3 is a control block diagram of a content providing server 200 according to an exemplary embodiment. As shown therein, the content providing server 200 includes a storage unit 210, a second communication unit 220, a controller 230, and a decrypting unit 240.

The content providing server 200 is a device capable of transmitting, to the video processing apparatus 100, a supplementary video signal for generating a 3D video signal corresponding to a 2D video signal. The supplementary video signal may or may not be stored in the content providing server 200. If the supplementary video signal is stored in another server (not shown), the content providing server 200 may receive the supplementary video signal from the other server (not shown) through the second communication unit 220, and transmit the received supplementary video signal to the video processing apparatus 100.

The storage unit 210 stores at least one supplementary video signal for generating a 3D video signal corresponding to a 2D video signal.

The second communication unit 220 is connected to the first communication unit 20 of the video processing apparatus 100 through a network such as a local area network (LAN), a wireless LAN (WLAN), etc. Accordingly, if the video processing apparatus 100 requests the supplementary video signal corresponding to the 2D video signal, the second communication unit 220 transmits the supplementary video signal to the video processing apparatus 100 in response to the request.

When the video processing apparatus 100 requests a supplementary video signal for generating a 3D video signal corresponding to a 2D video signal, the second controller 230 selects the supplementary video signal corresponding to the request among at least one supplementary video signal and controls the second communication unit 220 to transmit the selected supplementary video signal to the video processing apparatus 100.

The decrypting unit 240 can decrypt the encrypted information. The request for the supplementary video signal includes at least one of the information of the video processing apparatus 100 and the information of the received 2D video signal. If the information is the encrypted information, the decrypting unit 240 decrypts the encrypted information under control of the controller 230.

The second controller 230 determines whether the video processing apparatus 100 is an electronic apparatus capable of processing a 3D image on the basis of the decrypted information. Also, the second controller 230 determines whether a 2D video signal is legitimate or whether there exists a supplementary video signal corresponding to the 2D video signal. As a result, if the video processing apparatus 100 is capable of processing a 3D image and there exists the supplementary video signal, the second controller 230 notifies the video processing apparatus 100 that there exists the supplementary video signal.

In accordance with the notification, if the video processing apparatus 100 requests the supplementary video signal, the second controller transmits the supplementary video signal through the second communication unit 220 to the video processing apparatus 100.

Figure 4:
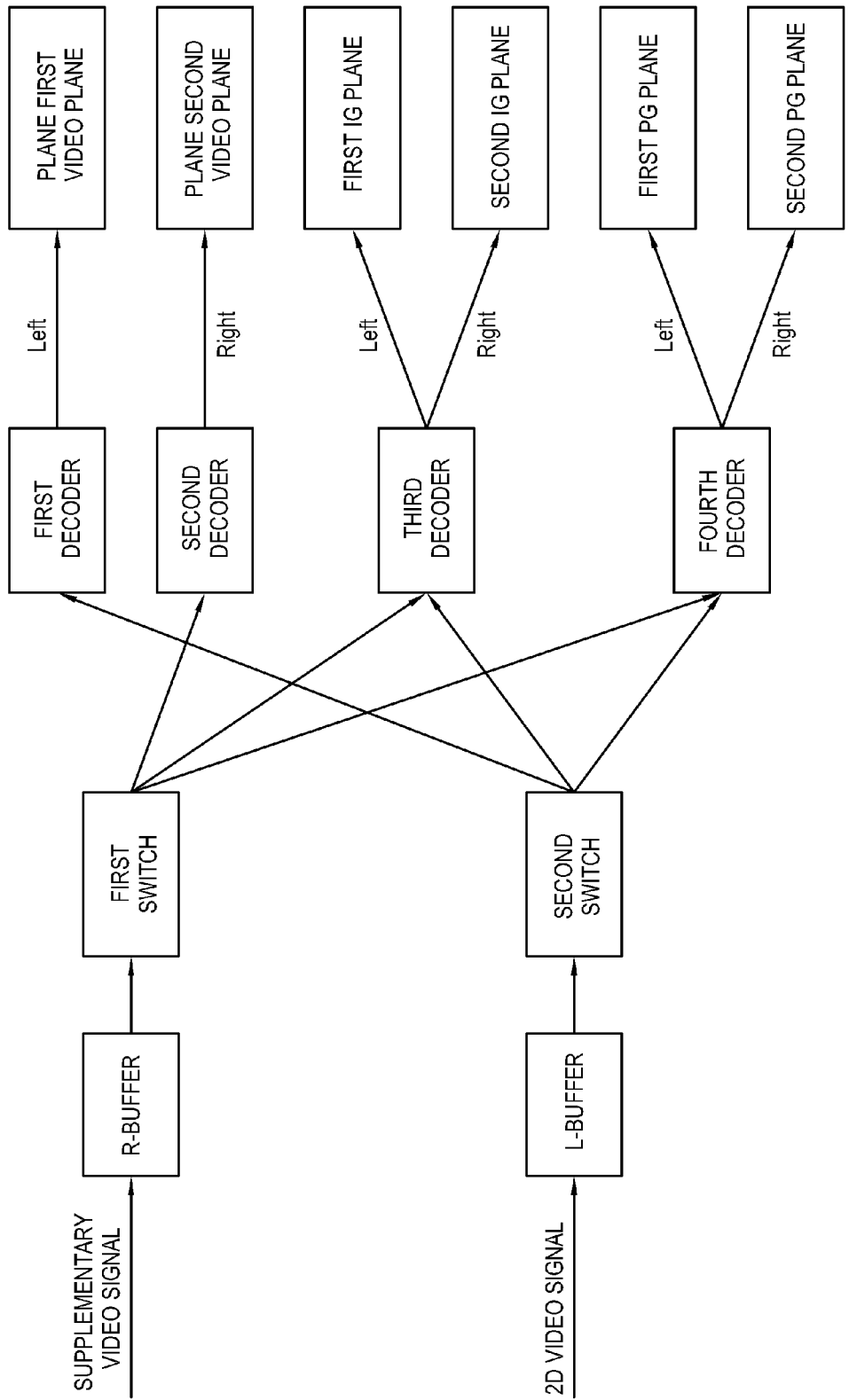
FIG. 4 is a view showing detailed operations of a signal processor in a video processing apparatus according to an exemplary embodiment.

FIG. 4 is a view showing detailed operations of a signal processor 30 in a video processing apparatus according to an exemplary embodiment.

The signal processor 30 uses a 2D video signal received through the receiver 10 as one of a left-eye video signal and a right-eye video signal for a 3D image, and uses a supplementary video signal received through the first communication unit 20 as the other, thereby generating a 3D video signal. In the present exemplary embodiment, the 2D video signal is used as the left-eye video signal, and the supplementary video signal is used as the right-eye video signal, though it is understood that another exemplary embodiment is not limited thereto.

The signal processor 30 forms a virtual package based on the 2D video signal and the supplementary video signal. If one virtual package is completely formed, the 2D video signal and the supplementary video signal are grouped into one package.

The signal processor 30 reads the 2D video signal and the supplementary video signal from one package. The 2D video signal is transmitted to a first decoder 31 through a second switch in order to generate the left-eye video signal, and the supplementary video signal is transmitted to a second decoder 33 through a first switch in order to generate the right-eye video signal. The first decoder decodes the 2D video signal and generates a first video plane for the left-eye video signal. The second decoder decodes the supplementary video signal and generates a second video plane for the right-eye video signal. If the 2D video signal and the supplementary video signal are included in a transport stream (TS) based on the MPEG, the first decoder and the second decoder include a decoder for decoding an advanced video coding (AVC)/multiview video coding (MVC) type codec.

Also, the 2D video signal and the supplementary video signal are transmitted to a third decoder for decoding interactive graphics (IG) data. The third decoder decodes the interactive graphics (IG) data, i.e., information about at least one of a user input button and a menu, and generates a first interactive graphics (IG) plane for the left-eye video signal and a second interactive graphics (IG) plane for the right-eye video signal.

Further, the 2D video signal and the supplementary video signal are transmitted to a fourth decoder for decoding presentation graphics (PG) data. The fourth decoder decodes the presentation graphics (PG) data, i.e., the information about the subtitles, etc., and generates a first presentation graphics (PG) plane for the left-eye video signal and a second presentation graphics (PG) plane for the right-eye video signal.

The signal processor 30 extracts information used for synchronization from the decoded 2D video signal and the decoded supplementary video signal, respectively. For example, the information used for the synchronization may include presentation time stamp (PTS) information. In accordance with the extracted PTS information, the first video plane, the first IG plane, and the first PG plane are selectively output as the left-eye video signal to the display unit 50; and the second video plane, the second IG plane, and the second PG plane are selectively output as the right-eye video signal to the display unit 50.

Also, the extracted PTS information is transmitted to the synchronous signal generator 80 and used in generating the synchronous signal.

Figure 5:
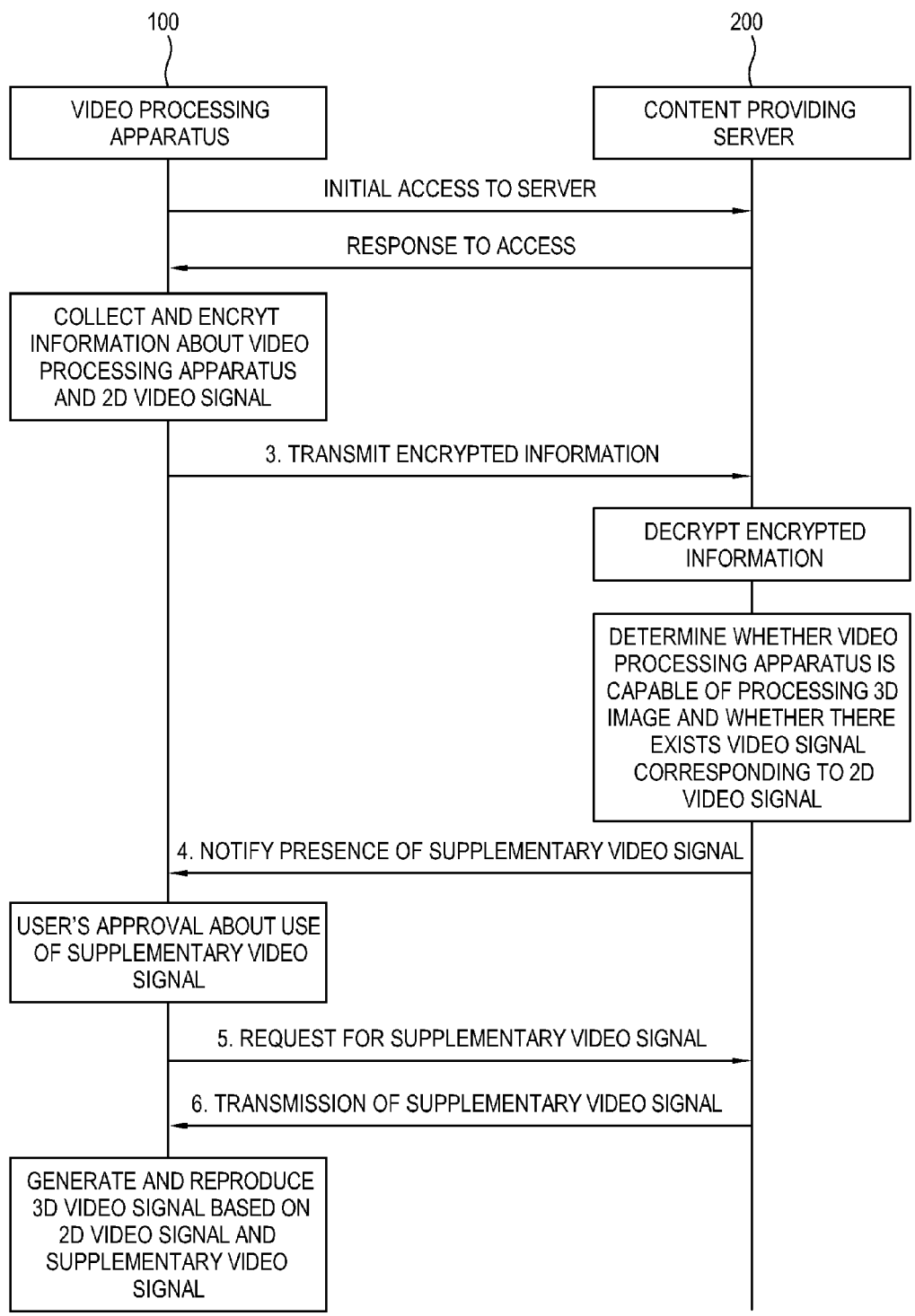
FIG. 5 shows a signal flow in the video processing system of FIG. 1.

FIG. 5 shows a signal flow in a video processing system according to an exemplary embodiment.

When receiving a 2D video signal through the receiver 10, the first communication unit 20 of the video processing apparatus 100 tries to initially access the content providing server 200 under control of the first controller 40. In accordance with the initial access, if receiving a signal from the content providing server 200 in response to the access, the first controller 40 collects and encrypts the information about the video processing apparatus 100 and the 2D video signal, and transmits the collected information to the content providing server 200.

The content providing server 200 decrypts the encrypted information.

The content providing server 200 determines whether the video processing apparatus 100 is capable of processing and reproducing a 3D image on the basis of the decrypted information about the video processing apparatus 100.

The video processing apparatus 100 and the content providing server 200 may include a predetermined protocol defined in extensible mark-up language (XML) or the like for authenticating the 2D video signal. If the 2D video signal is received from a Blu-ray disc (BD), information about the BD, such as an ID, a title, a manufacturer, a provider, etc., of the BD, is written through the predetermined protocol.

By receiving the information about the BD, the content providing server 200 can determine whether the BD is legitimate. In the case of a legitimate BD, it is searched whether there exists a supplementary video signal for generating a 3D video signal corresponding to the BD.

If the content providing server 200 determines that the video processing apparatus 100 is capable of processing and reproducing a 3D video signal and there exists a supplementary video signal corresponding to the 2D video signal, information that the supplementary video signal is available is transmitted to the video processing apparatus 100.

The video processing apparatus 100 outputs such information as the user notification information, and requests the supplementary video signal if receiving a user's approval signal for the use of the supplementary video signal through the user input unit 60. The content providing server 200 transmits the supplementary video signal to the video processing apparatus 100 in response to the request.

The video processing apparatus 100 generates and reproduces a 3D video signal based on the received supplementary video signal and 2D video signal.

Figure 6:
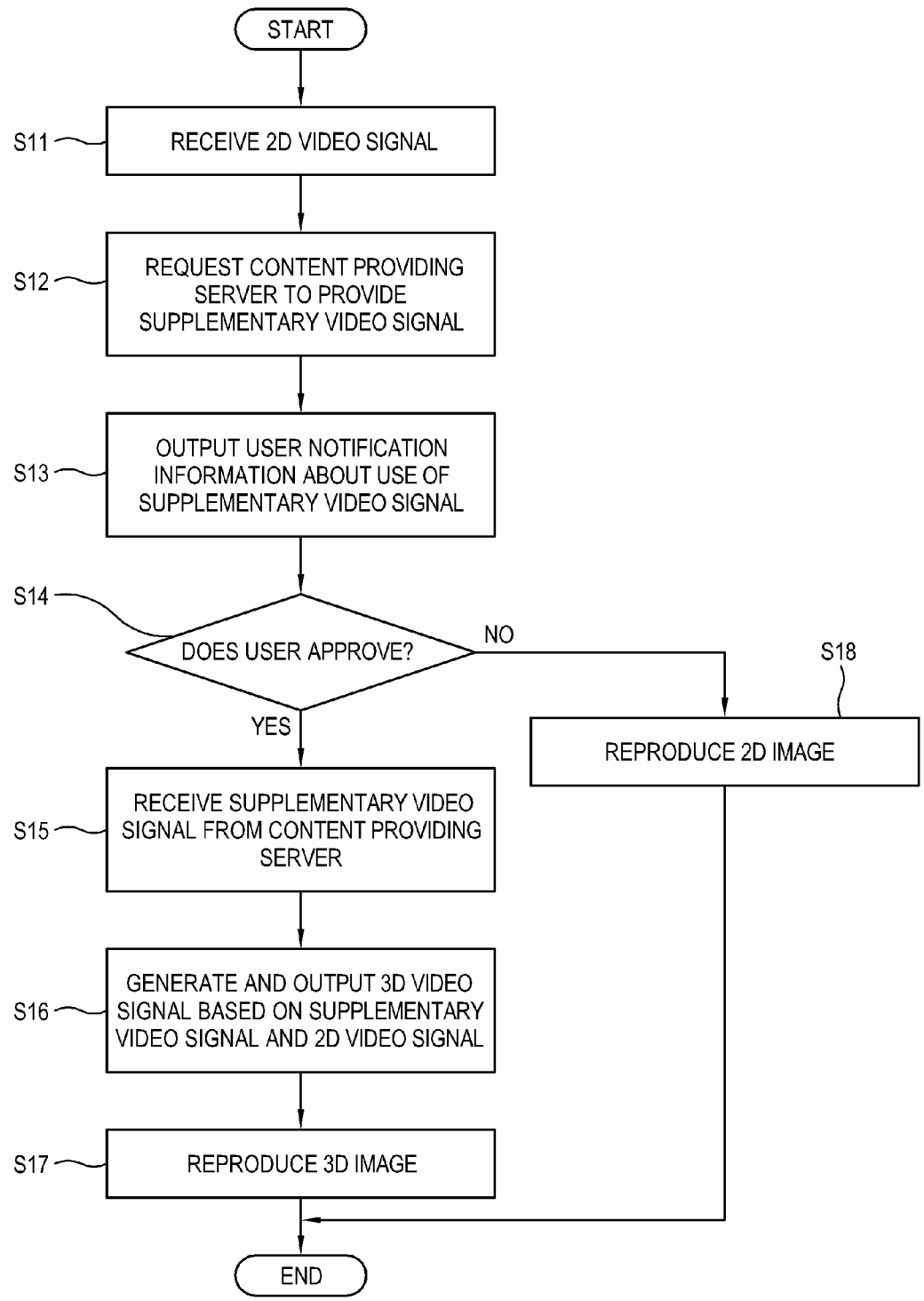
FIG. 6 is a control flowchart for explaining a control method for a video processing apparatus according to an exemplary embodiment.

FIG. 6 is a control flowchart for explaining a control method for a video processing apparatus 100 according to an exemplary embodiment.

When receiving a 2D video signal through the receiver 10 (operation S11), the first controller 40 controls the first communication unit 20 to request the content providing server 200 to transmit a supplementary video signal capable of generating a 3D video signal corresponding to the received 2D video signal (operation S12).

In accordance with the request, the first controller 40 outputs the user notification information about the use of the supplementary video signal when receiving information that there exists the supplementary video signal from the content providing server 200 (operation S13).

If a user does not approve the use of the supplementary video signal, the video processing apparatus 100 processes the received 2D video signal and reproduces the processed 2D video signal as a 2D image (operation S18).

If a user approves the use of the supplementary video signal, the video processing apparatus 100 receives the supplementary video signal from the content providing server 200 (operation S15), generates and outputs a 3D video signal based on the received supplementary video signal and 2D video signal (operation S16), and reproduces a 3D image (operation S17).

Figure 7:
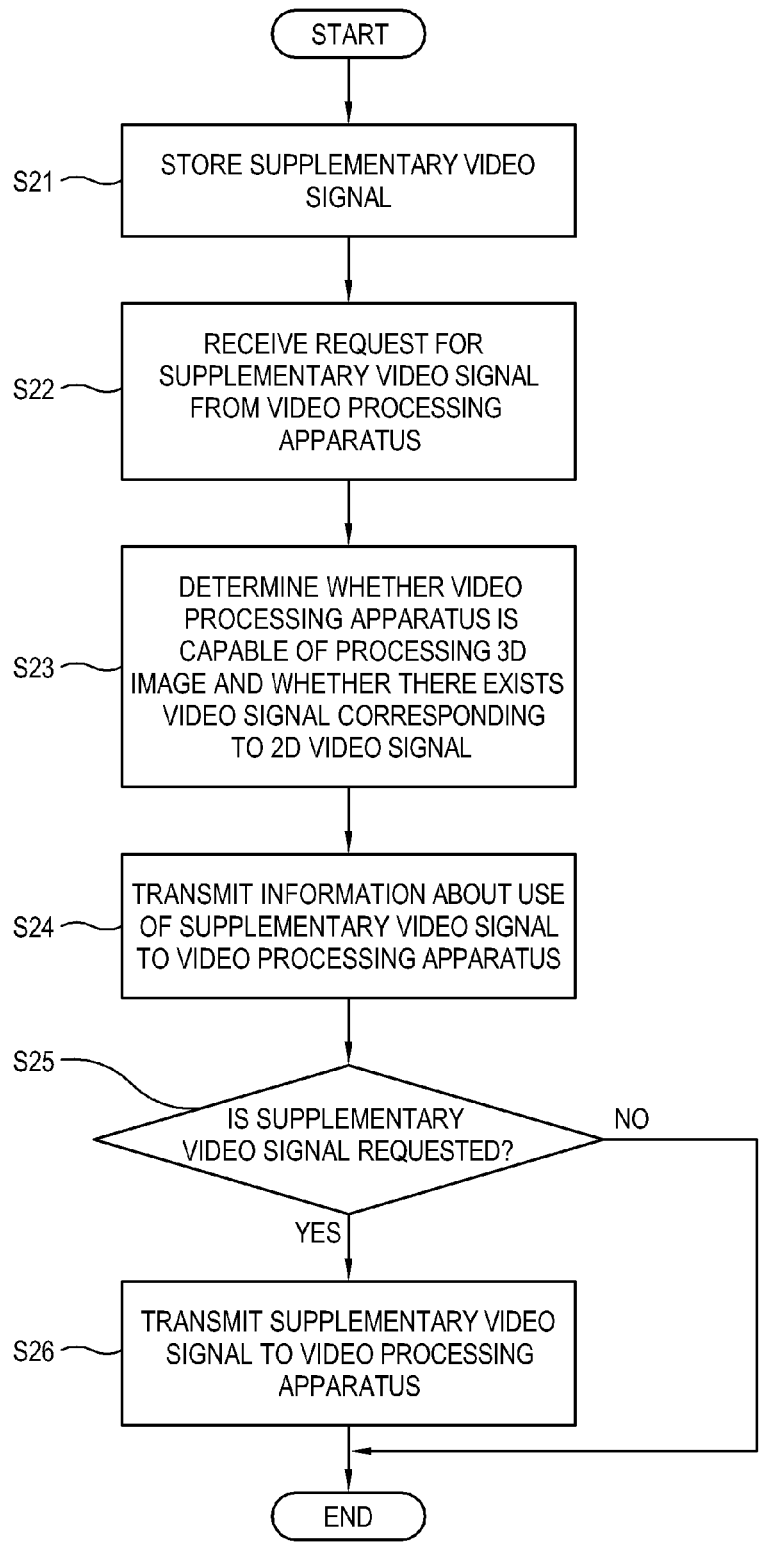
FIG. 7 is a control flowchart for explaining a control method for a content providing server according to an exemplary embodiment.

FIG. 7 is a control flowchart for explaining a control method for a content providing server 200 according to an exemplary embodiment.

The content providing server 200 stores at least one supplementary video signal for generating a 3D video signal corresponding to a 2D video signal (operation S21). When receiving a request for the supplementary video signal corresponding to the 2D video signal from the video processing apparatus 100 (operation S22), the content providing server 200 determines whether the video processing apparatus 100 is capable of processing and reproducing a 3D video signal on the basis of the information about the video processing apparatus 100 and the information about the 2D video signal received along with the request, and determines whether there exists the supplementary video signal corresponding to the 2D video signal (operation S23).

As a result, if there exists the supplementary video signal, the video processing apparatus 100 is informed that there exists the supplementary video signal (operation S24).

When the video processing apparatus 100 requests the content providing server 200 to transmit the supplementary video signal (operation S25), the content providing server 200 transmits the supplementary video signal to the video processing apparatus 100 (operation S26).

As described above, there are provided a video processing apparatus capable of generating and reproducing a 3D video signal based on a 2D video signal, a content providing server, and a control method thereof. Thus, it is possible to directly use the 2D video signal, and a user can enjoy a 3D image when a supplementary video signal is received through a network.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, one or more units of the video processing apparatus 100 and the content providing server 200 can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the inventive concept, the scope of which is defined in the appended claims and their equivalents.

What is claimed is:

1. A video processing apparatus comprising:
a receiver which receives a two-dimensional (2D) video signal from a memory which stores the 2D video signal;
a communicator which communicates with a content providing server providing a supplementary video signal for a three-dimensional (3D) video signal corresponding to the received 2D video signal;
a signal processor which processes the received 2D video signal and the supplementary video signal; and
a controller which controls the communicator to provide information related to the 2D video signal to the content providing server, request a supplementary video signal corresponding to the received 2D video signal and receive the supplementary video signal from the content providing server, and the signal processor to generate the 3D video signal based on the received supplementary video signal and the received 2D video signal,
wherein the communicator receives the supplementary video signal separately wherein the communicator receives the supplementary video signal separately from the receiver receiving the 2D video signal,
wherein the signal processor comprises:
a first decoder which decodes the received 2D video signal; and
a second decoder which decodes the received supplementary video signal, and
wherein the signal processor extracts information used for synchronization from the decoded 2D video signal and the decoded supplementary video signal, respectively, and synchronizes the 2D video signal and the supplementary video signal to be displayed as a 3D image in accordance with the extracted information.

2. The video processing apparatus according to claim 1, wherein the signal processor generates a 3D video signal by using the received 2D video signal as one of a left-eye video signal and a right-eye video signal, and using the received supplementary video signal as another one of the left-eye video signal and the right-eye video signal.

3. The video processing apparatus according to claim 1, further comprising a synchronous signal generator which generates a synchronous signal for opening and closing shutters of shutter glasses according to the extracted information used for the synchronization.

4. The video processing apparatus according to claim 1, wherein the controller controls the communicator to transmit at least one of information about the video processing apparatus and information about the received 2D video signal when requesting the supplementary video signal from the content providing server.

5. The video processing apparatus according to claim 4, further comprising an encrypting unit,
wherein the controller controls the encrypting unit to encrypt at least one of the information about the video processing apparatus and the information about the received 2D video signal, and controls the communicator to transmit the encrypted information.

6. The video processing apparatus according to claim 1, wherein the controller outputs user notification information about use of the supplementary video signal corresponding to the 2D video signal.

7. The video processing apparatus according to claim 6, further comprising a display unit which displays the user notification information.

8. The video processing apparatus according to claim 7, further comprising a user input unit which receives a user input in response to the displayed user notification information,
wherein the controller controls the communicator to receive the supplementary video signal when the received user input is for approving the use of the supplementary video signal through the user input unit.

9. The video processing apparatus according to claim 1, wherein the information related to 2D video signal includes at least one of identification information of the memory and title information of the 2D video signal.

10. A content providing server comprising:
a communicator which communicates with an external video processing apparatus; and
a controller which controls the communicator to select a supplementary video signal from among at least one supplementary video signal and to transmit the selected supplementary video signal to the external video processing apparatus in response to a request for the supplementary video signal for generating a 3D video signal corresponding to a 2D video signal from the external video processing apparatus,
wherein the communicator transmits the supplementary video signal separately from a transmitting of the 2D video signal, and
wherein the 2D video signal comprises information used for synchronizing the 2D video signal and the supplementary video signal to be displayed as a 3D image when the external video processing apparatus decodes the 2D video signal the supplementary video signal.

11. The content providing server according to claim 10, further comprising a storage unit which stores the at least one supplementary video signal.

12. A control method of a video processing apparatus, the control method comprising:
receiving a two-dimensional (2D) video signal from a memory which stores the 2D video signal;
providing information related to the received 2D video signal to a content providing server;
requesting the content providing server to transmit a supplementary video signal corresponding to the 2D video signal; and
generating a three-dimensional (3D) video signal based on the 2D video signal and the supplementary video signal received in response to the requesting,
wherein the supplementary video signal is received separately from the 2D video signal,
wherein the generating the 3D video signal comprises decoding the received 2D video signal and the received supplementary video signal, respectively, and
wherein the generating the 3D video signal comprises:
extracting information used for synchronization from the decoded 2D video signal and the decoded supplementary video signal, respectively; and
synchronizing the 2D video signal and the supplementary video signal to be displayed as a 3D image in accordance with the extracted information.

13. The control method according to claim 12, wherein the generating the 3D video signal comprises generating the 3D video signal by using the received 2D video signal as one of a left-eye video signal and a right-eye video signal and the received supplementary video signal as another one of the left-eye video signal and the right-eye video signal.

14. The control method according to claim 12, further comprising generating a synchronous signal for opening and closing shutters of shutter glasses according to the extracted information used for the synchronization.

15. The control method according to claim 14, wherein the requesting the supplementary video signal comprises transmitting at least one of information about the video processing apparatus and information about the received 2D video signal when requesting the supplementary video signal.

16. The control method according to claim 15, further comprising encrypting at least one of the information about the video processing apparatus and the information about the received 2D video signal.

17. The control method according to claim 16, further comprising outputting user notification information about use of the supplementary video signal corresponding to the 2D video signal.

18. The control method according to claim 17, further comprising:
displaying the user notification information; and
receiving the supplementary video signal when receiving a user's input for approving the use of the supplementary video signal in response to the displayed user notification information.

19. The method according to claim 12, wherein the information related to 2D video signal includes at least one of identification information of the memory and title information of the 2D video signal.

20. A control method of a content providing server, the control method comprising:
receiving a request from an external video processing apparatus to provide a supplementary video signal for generating a 3D video signal corresponding to a 2D video signal; and
selecting, from among at least one supplementary video signal, the supplementary video signal corresponding to the received request and transmitting the selected supplementary video signal to the external video processing apparatus,
wherein the supplementary video signal is transmitted separately from the 2D video signal, and
wherein the 2D video signal comprises information used for synchronizing the 2D video signal and the supplementary video signal to be displayed as a 3D image when the external video processing apparatus decodes the 2D video signal the supplementary video signal.

21. The control method according to claim 20, further comprising storing the at least one supplementary video signal.

22. The control method according to claim 20, wherein:
the request comprises information about at least one of the external video processing apparatus and the 2D video signal; and
the selecting the supplementary video signal comprises:
determining, based on the information about at least one of the external video processing apparatus and the 2D video signal, whether the at least one supplemental video signal comprises the supplemental video signal corresponding the 2D video signal,
transmitting, to the external video processing apparatus, a notification that the at least one supplemental video signal comprises the supplemental video signal corresponding to the 2D video signal if the at least one supplemental video signal is determined to comprise the supplemental video signal corresponding the 2D video signal, and
transmitting the supplementary video signal to the external video processing apparatus in response to a request for the supplementary video signal from the external video processing apparatus that has received the transmitted notification.

23. A video processing system comprising:
a video processing apparatus which receives a two-dimensional (2D) video signal from a memory which stores the 2D video signal, transmits a request for a supplementary video signal used to generate a three-dimensional (3D) video signal corresponding to the received 2D video signal, and, if the supplementary video signal is received in response to the transmitted request, generates the 3D video signal based on the received supplementary video signal and the received 2D video signal; and
a content providing server which receives the request from the video processing apparatus, determines, according to the received request, whether the supplementary video signal corresponding to the 2D video signal exists among at least one supplementary video signal, and, if the supplementary video signal corresponding to the 2D video signal exists, transmits the supplementary video signal to the video processing apparatus,
wherein the video processing apparatus receives the supplementary video signal separately from the 2D video signal,
wherein the video processing apparatus decodes the received 2D video signal, and a second decoder which decodes the received supplementary video signal, and
wherein the video processing apparatus extracts information used for synchronization from the decoded 2D video signal and the decoded supplementary video signal, respectively, and synchronizes the 2D video signal and the supplementary video signal to be displayed as a 3D image in accordance with the extracted information.

24. The video processing system according to claim 23, wherein the information related to 2D video signal includes at least one of identification information of the memory and title information of the 2D video signal.

* * * * *